United States Patent
Tucker et al.

(10) Patent No.: US 11,085,346 B2
(45) Date of Patent: Aug. 10, 2021

(54) MIXER FOR A VEHICLE EXHAUST SYSTEM

(71) Applicant: Faurecia Emissions Control Technologies, USA, LLC, Columbus, IN (US)

(72) Inventors: Alfred N. Tucker, Columbus, IN (US); Tomasz Kozakeiwicz, Columbus, IN (US); Syed Saleem Quadri, Columbus, IN (US); Jeffery Prairie, Franklin, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/611,398

(22) PCT Filed: May 31, 2017

(86) PCT No.: PCT/US2017/035130
§ 371 (c)(1),
(2) Date: Nov. 6, 2019

(87) PCT Pub. No.: WO2018/222180
PCT Pub. Date: Dec. 6, 2018

(65) Prior Publication Data
US 2020/0165952 A1 May 28, 2020

Related U.S. Application Data

(63) Continuation of application No. PCT/US2017/035130, filed on May 31, 2017.

(51) Int. Cl.
*F01N 3/20* (2006.01)
*F01N 3/28* (2006.01)

(52) U.S. Cl.
CPC ........... *F01N 3/2896* (2013.01); *F01N 3/206* (2013.01); *F01N 3/2066* (2013.01);
(Continued)

(58) Field of Classification Search
CPC ...... F01N 3/206; F01N 3/2066; F01N 3/2892; F01N 3/2896; F01N 2240/20; F01N 2610/02
See application file for complete search history.

(56) References Cited

U.S. PATENT DOCUMENTS 7,533,520 B2  5/2009  Cheng et al.
8,141,353 B2  3/2012  Zheng et al.
(Continued)

FOREIGN PATENT DOCUMENTS

WO   2014051617 A1   4/2014
WO    201509145 A1   1/2015

OTHER PUBLICATIONS

International Preliminary Report of Patentability for PCT/US2017/035130 dated Dec. 12, 2019.
(Continued)

*Primary Examiner* — Audrey K Bradley
(74) *Attorney, Agent, or Firm* — Carlson, Gaskey & Olds, P.C.

(57) ABSTRACT

A vehicle exhaust system includes an exhaust component having an inner wall to define an internal cavity that provides an engine exhaust gas flow path from an inlet to an outlet. An injector is configured to spray a fluid into the internal cavity to mix with engine exhaust gas. An inlet baffle is mounted to the exhaust component adjacent the inlet and includes at least one scoop having a scoop length that is greater than a scoop width. The scoop includes a scoop opening that directs engine exhaust gas toward the (Continued)

inner wall of the internal cavity at a location that is upstream of spray injected by the injector.

20 Claims, 6 Drawing Sheets

(52) U.S. Cl.
CPC ........ *F01N 3/2892* (2013.01); *F01N 2240/20* (2013.01); *F01N 2610/02* (2013.01)

(56) References Cited

U.S. PATENT DOCUMENTS

| | | |
|---|---|---|
| 9,248,404 B2 | 2/2016 | Brunel et al. |
| 2010/0212292 A1 | 8/2010 | Rusch et al. |
| 2011/0239631 A1 | 10/2011 | Bui et al. |
| 2014/0116037 A1 | 5/2014 | Lebas et al. |
| 2014/0345257 A1 | 11/2014 | Levin et al. |
| 2015/0110681 A1* | 4/2015 | Ferront ................. F01N 3/2892 422/168 |
| 2015/0267596 A1* | 9/2015 | Tobben .................. F01N 13/08 60/274 |
| 2016/0131007 A1* | 5/2016 | Kauderer ............ F01N 13/0097 422/177 |
| 2016/0319723 A1 | 11/2016 | Alano et al. |
| 2016/0319724 A1 | 11/2016 | Alano et al. |
| 2016/0361694 A1* | 12/2016 | Brandl ............... B01D 53/9431 |

OTHER PUBLICATIONS

International Search Report and Written Opinion for International Patent Application PCT/US2017/035130 dated Feb. 22, 2018.

* cited by examiner

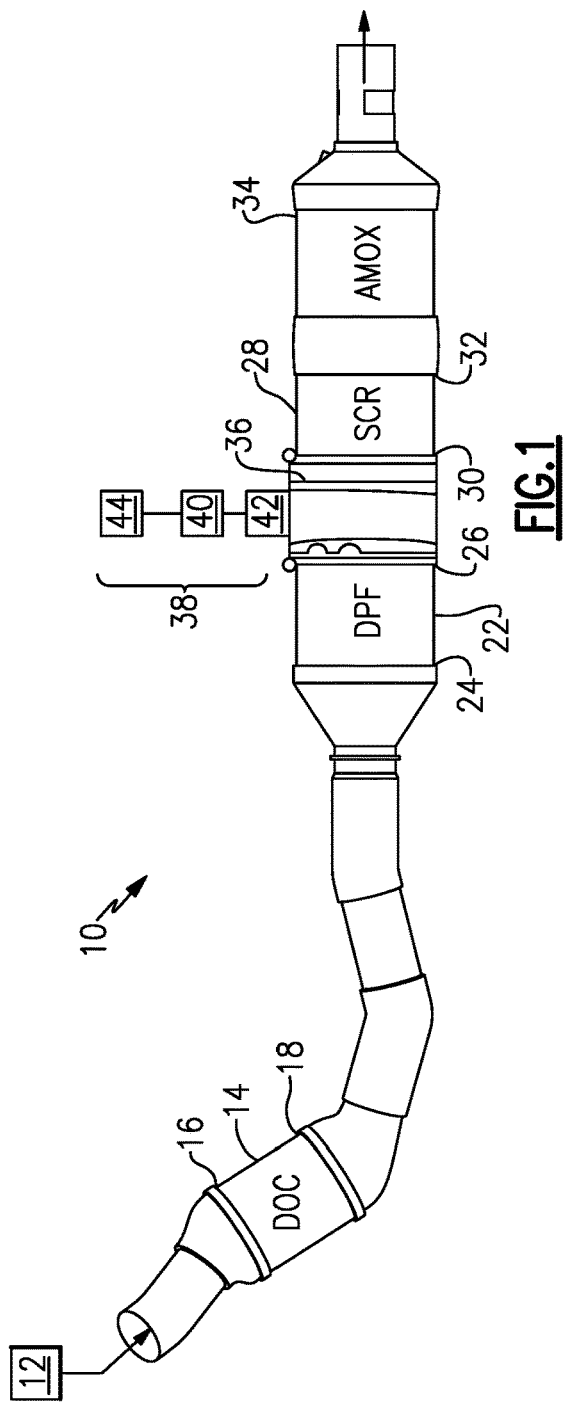
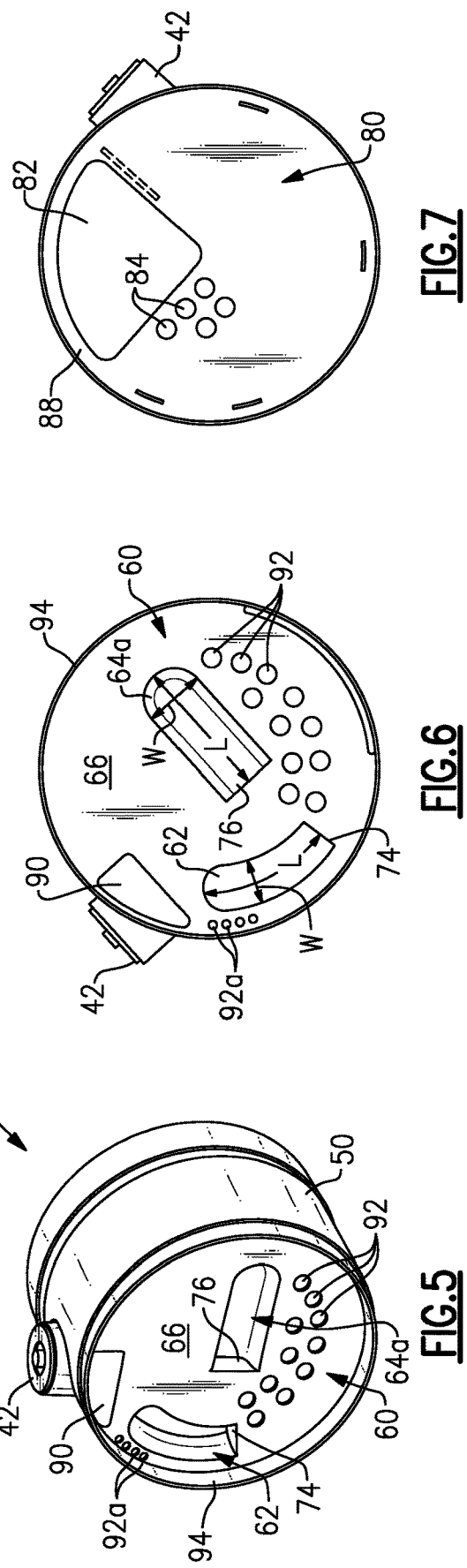

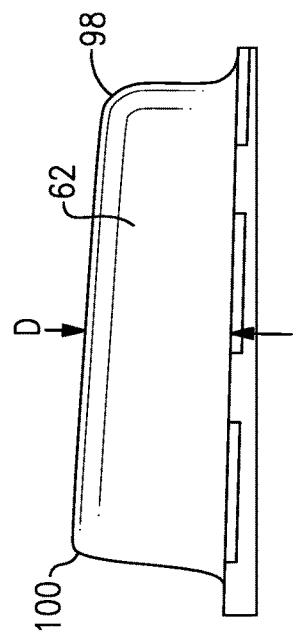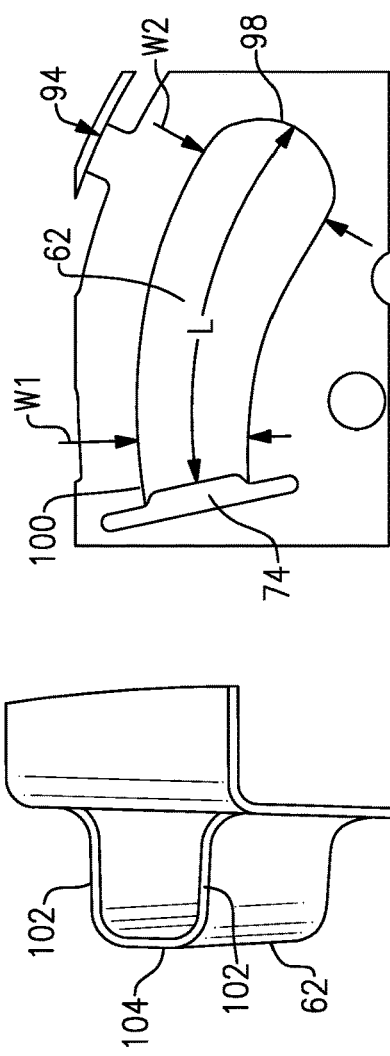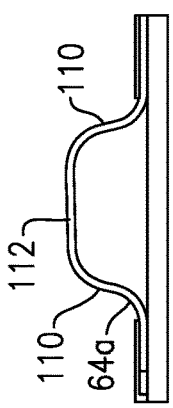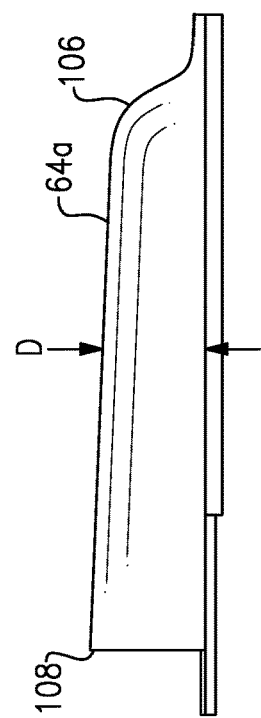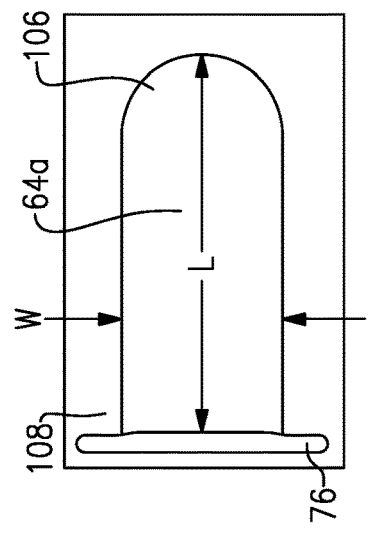

MIXER FOR A VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a fluid such as a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. For example, there may be a lower ammonia uniformity index, there may be an increased pressure drop across the mixer, or there may be higher ammonia emissions during active diesel particulate filter (DPF) regeneration.

SUMMARY OF THE INVENTION

In one exemplary embodiment, a vehicle exhaust system includes an exhaust component having an inner wall to define an internal cavity that provides an engine exhaust gas flow path from an inlet to an outlet. An injector is configured to spray a fluid into the internal cavity to mix with engine exhaust gas. An inlet baffle is mounted to the exhaust component adjacent the inlet and includes at least one scoop having a scoop length that is greater than a scoop width. The scoop includes a scoop opening that directs engine exhaust gas toward the inner wall of the internal cavity at a location that is upstream of spray injected by the injector.

In a further embodiment of the above, the at least one scoop comprises no more than four scoops.

In a further embodiment of any of the above, the at least one scoop comprises at least a first scoop and a second scoop, wherein the first scoop is positioned to extend along an outer peripheral edge of the inlet baffle and has a first scoop opening that directs engine exhaust gas toward the inner wall of the internal cavity, and wherein the second scoop is positioned adjacent a central location of the inlet baffle and has a second scoop opening that directs engine exhaust gas in a direction toward the first scoop.

In a further embodiment of any of the above, the first scoop is curved in a direction extending along the scoop length of the first scoop, and wherein the second scoop is curved or straight in a direction extending along the scoop length of the second scoop.

In another exemplary embodiment, a mixer for a vehicle exhaust system includes an outer housing and an inner housing spaced radially inward of the outer housing to define a gap. The inner housing has an inner wall to define an internal cavity that provides an engine exhaust gas flow path from an inlet to an outlet. An injector is configured to spray a fluid into the internal cavity to mix with engine exhaust gas. An inlet baffle is mounted to the exhaust component adjacent the inlet and includes at least a first scoop and a second scoop each having a scoop length that is greater than a scoop width. The first scoop includes a first scoop opening that directs engine exhaust gas toward the inner wall of the internal cavity, and the second scoop includes a second scoop opening that directs engine exhaust gas in a direction toward the first scoop. An outlet baffle has a primary opening through which a majority of a mixture of engine exhaust gas and spray exits the internal cavity via the outlet, and a plurality of secondary openings that are smaller than the primary opening.

In a further embodiment of any of the above, the inlet baffle includes a plurality of secondary openings are located circumferentially between the first scoop opening and an end of the second scoop that is opposite the second scoop opening, and wherein the inlet baffle includes a plurality of slots that direct engine exhaust gas into the gap between the inner and outer housings.

In a further embodiment of any of the above, each of the first and second scoops comprise a recessed portion that extends inwardly from an upstream surface of the inlet baffle such that the first scoop has a first depth and the second scoop has a second depth that is less than the first depth.

These and other features of this application will be best understood from the following specification and drawings, the following of which is a brief description.

BRIEF DESCRIPTION OF THE DRAWINGS

FIG. 1 illustrates one example of an exhaust system with a mixer according to the subject invention.

FIG. 5 is a perspective view of another example of a mixer as used in the exhaust system of FIG. 1.

FIG. 6 is an end view of an inlet baffle from the mixer of FIG. 5.

FIG. 7 is an end view of an outlet baffle from the mixer of FIG. 5.

FIG. 8A is a top view of a curved scoop as used in the mixer of FIG. 2A or FIG. 5.

FIG. 8B is a side view of the curved scoop of FIG. 8A.

FIG. 8C is a section view of the curved scoop of FIG. 8A.

FIG. 9A is a top view of a straight scoop as used in the mixer of FIG. 5.

FIG. 9B is a side view of the straight scoop of FIG. 9A.

FIG. 9C is a section view of the straight scoop of FIG. 9A.

DETAILED DESCRIPTION

Figure 2A:
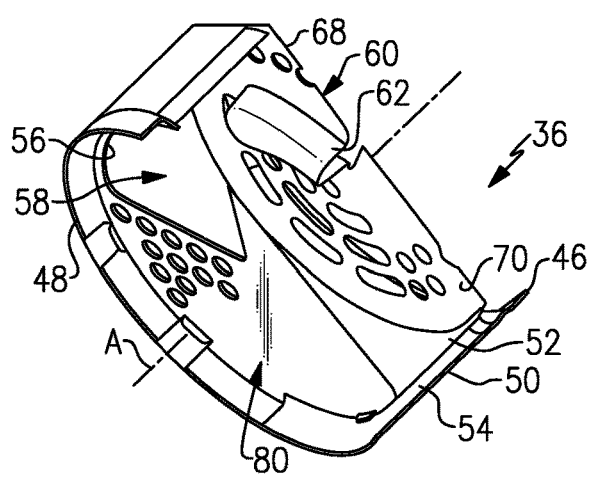
FIG. 2A is perspective view, in partial section, of one example of the mixer from FIG. 1.

FIG. 1 shows a vehicle exhaust system 10 that conducts hot exhaust gases generated by an engine 12 through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known.

In one example configuration shown in FIG. 1, the exhaust components direct engine exhaust gases into a diesel oxidation catalyst (DOC) 14 having an inlet 16 and an outlet 18. Downstream of the DOC 14 there may be a diesel particulate filter (DPF) 22 that is used to remove contaminants from the exhaust gas as known. The DPF has an inlet 24 and an outlet 26. Downstream of the DOC 14 and optional DPF 22 is a selective catalytic reduction (SCR) catalyst 28 having an inlet 30 and an outlet 32. The outlet 32 communicates exhaust gases to downstream exhaust components 34. Optionally, component 28 can comprise a catalyst that is configured to perform a selective catalytic reduction function and a particulate filter function. The various downstream exhaust components 34 can include one or more of the following: pipes, additional filters, valves, additional catalysts, mufflers etc. These exhaust components can be mounted in various different configurations and combinations dependent upon vehicle application and available packaging space.

A mixer 36 is positioned upstream of the inlet 30 of the SCR catalyst 28 and downstream from the outlet 18 of the DOC 14, or the outlet 26 of the DPF 22. The upstream catalyst and downstream catalyst can be arranged to be in-line, parallel, or angled relative to each other. The mixer 36 is used to generate a swirling or rotary motion of the exhaust gas. This will be discussed in greater detail below.

An injection system 38 is used to inject a fluid such as DEF or a reducing agent, such as a solution of urea and water for example, into the exhaust gas stream upstream from the SCR catalyst 28 such that the mixer 36 can mix the fluid and exhaust gas thoroughly together. The injection system 38 includes a fluid supply 40, a doser or injector 42, and a controller 44 that controls injection of the fluid as known.

Figure 2B:
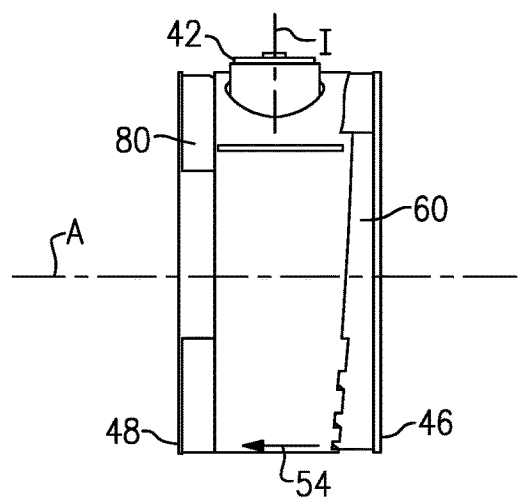
FIG. 2B is a side section view of the mixer of FIG. 2A.

One example of a mixer 36 is shown in FIGS. 2A-2B. The mixer 36 defines a mixer center axis A and has an inlet 46 configured to receive the engine exhaust gases from the outlet 26 of the DPF 22 or the outlet 18 of the DOC 14. The mixer 36 has an outlet 48 to direct a mixture of swirling engine exhaust gas and products transformed from the injected fluid to the inlet 30 to the SCR catalyst 28. The mixer 36 includes an outer housing 50 and an inner housing 52 spaced radially inward of the outer housing 50 to define a gap 54. The inner housing 52 has an inner wall 56 that defines an internal cavity 58 that provides an engine exhaust gas flow path from the inlet 46 to the outlet 48.

The mixer 36 includes an inlet baffle 60 mounted to the inner 52 and/or outer 50 housing adjacent to the inlet 46. The inlet baffle 60 includes one or more elongated scoops that are used to direct engine exhaust gas into the internal cavity 58 to mix with spray injected by the injector 42. The scoops are arranged in a beneficial configuration on the inlet baffle 60 to control exhaust gas flow within the internal cavity 58 to improve performance and to minimize deposit formation on inner wall surfaces. The number of scoops can vary; however, the number of scoops is preferably no more than four. In one preferred configuration, the inlet baffle 60 includes only two scoops. These different configurations will be discussed in greater detail below.

Figure 3:
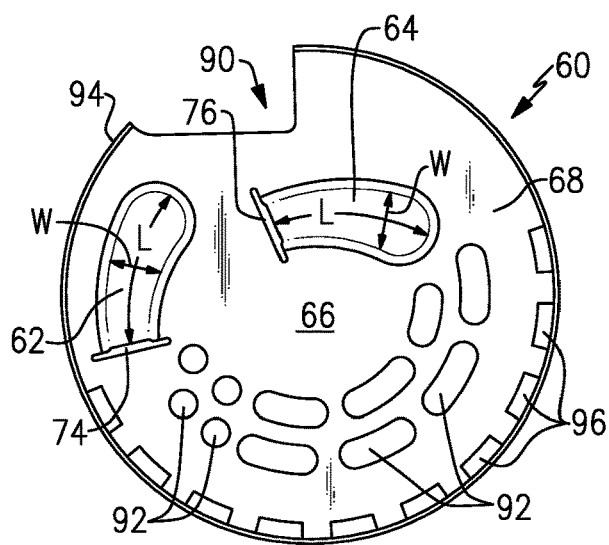
FIG. 3 is an end view of an inlet baffle from the mixer of FIG. 2A.

In one preferred configuration, the mixer 36 includes a first scoop 62 and a second scoop 64 (FIG. 3). Each scoop 62, 64 is elongated such that each scoop 62, 64 has a scoop length L that is greater than a scoop width W. In the example shown in FIG. 3, both scoops 62, 64 are curved in a direction extending along their associated length L. In one example, the inlet baffle 60 comprises a flat plate 66 having an upstream surface 68 and a downstream surface 70 that faces the internal cavity 58 with the scoops 62, 64 comprising recessed areas formed in the flat plate 66.

In the example shown in FIG. 3, the first scoop 62 is positioned to extend along an outer peripheral edge 94 of the inlet baffle 60 while the second scoop 64 is located at more radially inward location relative to the first scoop 62. The first scoop 62 includes a first scoop opening 74 (FIG. 3) that directs engine exhaust gas toward the inner wall 56 of the internal cavity 58. The scoop opening 74 is positioned such that engine exhaust gas exiting this opening 74 into the internal cavity 58 provides a grazing flow to spray exiting the injector 42. Further, the location and curvature of the first scoop 62 directs exhaust gas flow toward the inner wall 56 to reduce the likelihood of spray deposits forming on the wall 56. The second scoop 64 includes a second scoop opening 76 that directs the engine exhaust gas in a direction toward the first scoop 62. More specifically, engine exhaust gas exiting this opening 76 into the internal cavity 58 is directed by the position and curvature of the second scoop 64 to interact with flow exiting the first scoop opening 74 to push more flow into the spray area to further improve the mixing effect.

Figure 4:
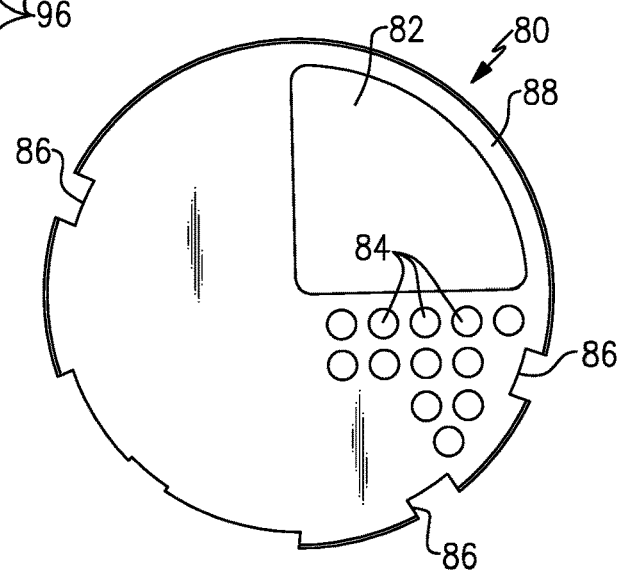
FIG. 4 is an end view of an outlet baffle from the mixer of FIG. 2A.

The mixer 36 also includes an outlet baffle 80 through which a mixture of spray and exhaust gas exits the outlet 48. In the example shown in FIG. 4, the outlet baffle 80 comprises a flat plate that includes a primary opening 82 through which a majority of a mixture of engine exhaust gas and spray exits the internal cavity 58 and a plurality of secondary openings 84 that are smaller than the primary opening 82. The secondary openings 84 help reduce back pressure and can be configured to have different shapes, sizes, and/or patterns in various combinations. The outlet baffle 80 may also include openings or slots 86 formed along a peripheral edge 88 of the outlet baffle 80 to provide an exit path for exhaust gas flowing in the gap 54 between the outer 50 and inner 52 housings. Note that while flat plates are shown in the disclosed examples for the inlet 60 and outlet 80 baffles, it should be understood that a contoured or helical plate configuration could also be used. However, the flat plate configuration is preferred as it provides improved performance and is easier to manufacture.

In addition to having the scoop openings 74, 76, the inlet baffle 60 also includes a primary opening 90 and a plurality of secondary openings 92. The primary opening 90 is positioned at a peripheral edge 94 of the inlet baffle 60 and extends circumferentially along the edge 94 for a desired distance to provide a sufficient size opening 90 to direct a desired amount of exhaust gas into the internal cavity 58. The primary opening 90 is positioned near the injector 42 to direct exhaust gas toward an area where the spray is injected to the mixer 36. This will be discussed in greater detail below.

The secondary openings 92 are smaller than the primary opening 90. The secondary openings 92 can be configured to have different shapes, sizes, and/or patterns in various combinations. In the example shown in FIG. 3, the inlet baffle 60 includes secondary openings 92 that are circular and elliptical in shape and which are circumferentially spaced apart from each other in a location that extends from the first scoop opening 74 to an end of the second scoop 64 that is opposite the second scoop opening 76. The inlet baffle 60 may also include openings or slots 96 formed along the peripheral edge 94 of the inlet baffle 60 to provide an inlet path for exhaust gas flowing in the gap 54 between the outer 50 and inner 52 housings. In the example shown in FIG. 3, the slots 96 are radially outward of the secondary openings 92 and are circumferentially spaced apart from each other in a location that extends from the first scoop opening 74 to the end of the second scoop 64 that is opposite the second scoop opening 76.

The example shown in FIGS. 2A-2B and FIGS. 3-4 disclose a configuration where the first 62 and second 64 scoops are both curved. The example of FIGS. 5-7 show an example where the first scoop 62 is curved and the second scoop 64a is straight. As shown in FIG. 5, both scoops 62, 64a extend inwardly of the upstream surface 68 to form protruding portions in the downstream surface 70 as shown in FIG. 6. In this example, the first scoop opening 74 (FIGS. 5-6) directs engine exhaust gas toward the inner wall 56 of the internal cavity 58. The scoop opening 74 is positioned such that engine exhaust gas exiting this opening 74 into the internal cavity 58 provides a grazing flow to spray exiting the injector 42. Further, the location and curvature of the first scoop 62 directs exhaust gas flow toward the inner wall 56 to reduce the likelihood of spray deposits forming on the wall 56. The second scoop opening 76 is positioned to direct the exhaust gas in a direction toward the flow exiting the first scoop opening 76. More specifically, the straight second scoop 64a is positioned such that exhaust gas exiting the scoop opening 76 directly interacts with flow exiting the first scoop opening 74 to push more flow into the spray area to further improve the mixing effect.

In the example shown in FIGS. 5-6, the inlet baffle 60 includes secondary openings 92 that are circular in shape and which are circumferentially spaced apart from each other in a location that extends from the first scoop opening 74 to the end of the second scoop 64a that is opposite the second scoop opening 76. Additional smaller secondary openings 92a are positioned radially outward of the first scoop 62 and are circumferentially spaced apart from each other immediately adjacent the primary opening 90. The curved first scoop 62 extends circumferentially along the peripheral edge 94 of the inlet baffle 60 and the straight second scoop 64a is positioned centrally on the inlet baffle 60. The primary opening 90 is positioned near the injector 42 (FIG. 5) and approximately 25% of the inlet baffle 60 comprises a solid surface that is free from openings. The outlet baffle 80 shown in FIG. 7 is similar to the outlet baffle 80 of FIG. 4 but includes an optional pattern of secondary openings 84.

FIGS. 8A-8C show the curved scoop 62 in greater detail. The curved scoop 62 has a narrower width W1 at the scoop opening 74. The width then gradually increases to a maximum width W2 that is at an end 98 of the scoop 62 that is opposite from the scoop opening 74. The scoop 62 extends circumferentially at a location that is just radially inward of the outer peripheral edge 94 of the inlet baffle 60. As shown in FIG. 8B, the scoop has a depth D. The depth D is shallower at the end 98 opposite from the opening 74 and gradually increases to a maximum depth that is at an end 100 of the scoop 62 that is near the opening 74. As shown in FIG. 8C, the cross-sectional shape of the scoop 62 is a U-shape with first and second sides 102 connected to each other via a base 104.

FIGS. 9A-9C show the straight scoop 64a in greater detail. As shown in FIG. 9A, the straight scoop 64a has a width W that is generally constant along the length L of the scoop 64a. As shown in FIG. 9B, the scoop has a depth D. The depth D is shallower at an end 106 opposite from the scoop opening 76 and gradually increases to a maximum depth that is at an end 108 of the scoop 64a that is near the opening 76. As shown in FIG. 9C, the cross-sectional shape of the scoop 64a is a U-shape with first and second sides 110 connected to each other via a base 112.

In one example, the second scoop 64a comprises a shallower U-shape than the U-shape of the first scoop 62. In a preferred configuration, this means that the first scoop 62 has a greater depth D than the second scoop 64a. This difference in depth improves overall performance of the mixer 36. Additionally, in one preferred example, the scoop length L for each scoop 62, 64, 64a is at least two times the width W for each of the scoops. Again, this relationship between length and width improves the overall mixer performance.

Further, the scoop depths can be varied using a bottom angle of the scoop from the base 104, 112 relative to the surface of the inlet baffle 60 to increase, decrease, or keep constant the cross-sectional area moving in a direction along the length of the scoop. This can be used to selectively direct/modify the flow inside the mixer 36 as required for deposit prevention, internal mixing, and back pressure relief. Further, the lengths and/or widths of the scoops can be adjusted/modified as needed to achieve a desired level of performance dependent upon application and/or packaging requirements for the mixer 36 within the vehicle exhaust system 10.

In one example, when the second scoop 64 comprises a curved scoop, the width configuration is similar to that of the scoop 62 shown in FIG. 8A while the depth D configuration is similar to that shown in FIG. 9B. As such, in one example, no matter what configuration the second scoop has, the first scoop always has a greater depth than the second scoop to provide improved performance.

Figure 10:
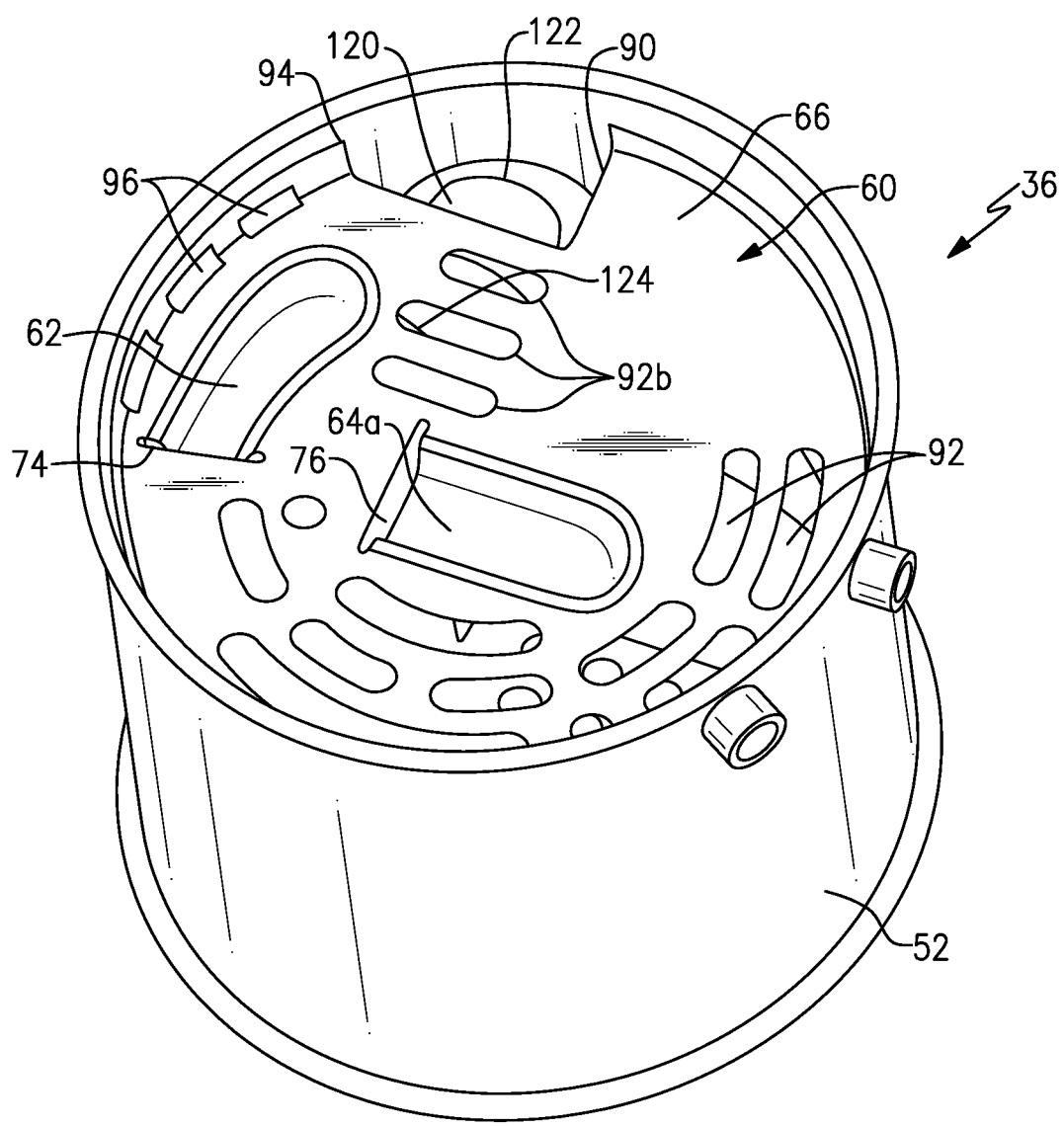
FIG. 10 is a perspective view of another example of a mixer as used in the exhaust system of FIG. 1.

FIG. 10 shows an example of a mixer 36 that includes a cone 120 that surrounds spray injected by the injector 42. The injector 42 defines an injection axis I that extends transversely to the mixer center axis A (FIG. 2B). A base end 122 of the cone 120 is positioned adjacent the inner surface of the injector mount (FIGS. 5-7) such that an annular gap is formed at the base end 122. Exhaust gas is directed to enter the base end 122 of the cone 120 through the annular gap in a direction transverse to the injection axis I. The cone 120 extends to a distal end 124 that is defined by a diameter that is greater than a diameter of the base end 122.

As discussed above, the primary opening 90 of the inlet baffle 60 is positioned adjacent the injector 42. As shown in FIG. 10, in one example, the primary opening 90 is positioned to overlap the cone 120 such that exhaust gas is directed toward the inlet area of the cone 120 at the base end 122. In one example, the primary opening 90 has a triangular or wedge shape that is formed at the outer peripheral edge 94 of the inlet baffle 60. The inlet baffle 60 shown in FIG.

10 is similar to that shown in FIGS. 5-6; however, the inlet baffle 60 of FIG. 10 includes an optional pattern of secondary openings 92.

In the example of FIG. 10, the inlet baffle 60 includes secondary openings 92 that are circular and elliptical in shape and which are circumferentially spaced apart from each other in a location that extends from the first scoop opening 74 to the end of the straight second scoop 64a that is opposite the second scoop opening 76. Further, in the example of FIG. 10, additional secondary openings 92b are positioned between the primary opening 90 and the second scoop opening 76. These secondary openings 92b are axially spaced apart from each other and are elongated/elliptical in shape; however, other shapes and spacing could also be utilized to achieve a desired performance level. The inlet baffle 60 of FIG. 10 also includes slots 96 that feed into the gap 54 between the inner 52 and outer 50 housings.

Figure 11:
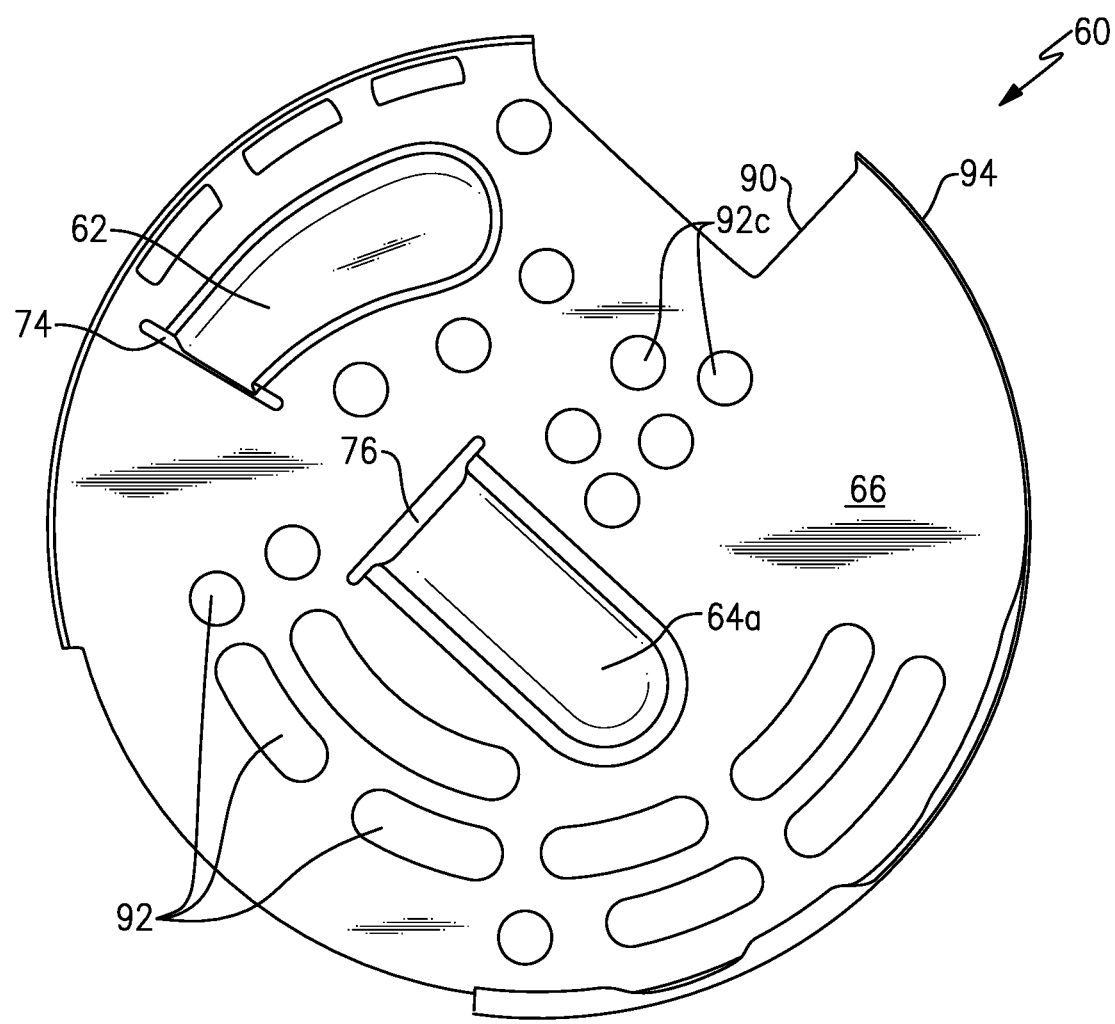
FIG. 11 is an end view of another example of an inlet baffle as used in the mixer of FIG. 2A, FIG. 5, or FIG. 10.

FIG. 11 shows another example of an inlet baffle 60. This example is similar to FIG. 10 but shows a different pattern of secondary openings 92. In this example, the elongated secondary openings 92b positioned between the primary opening 90 and the second scoop opening 76 are replaced by circular secondary openings 92c.

Figure 13:
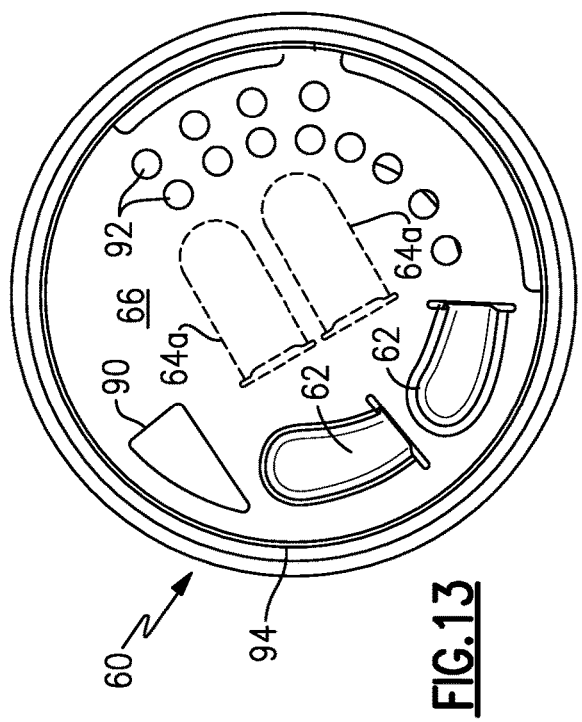
FIG. 13 is an end view of another example of an inlet baffle as used in the mixer of FIG. 2A, FIG. 5, or FIG. 10.
Figure 12:
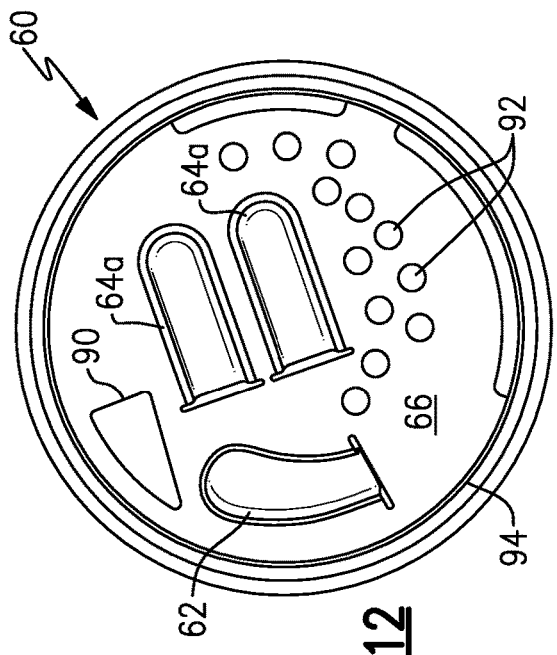
FIG. 12 is an end view of another example of an inlet baffle as used in the mixer of FIG. 2A, FIG. 5, or FIG. 10.
Figure 14:
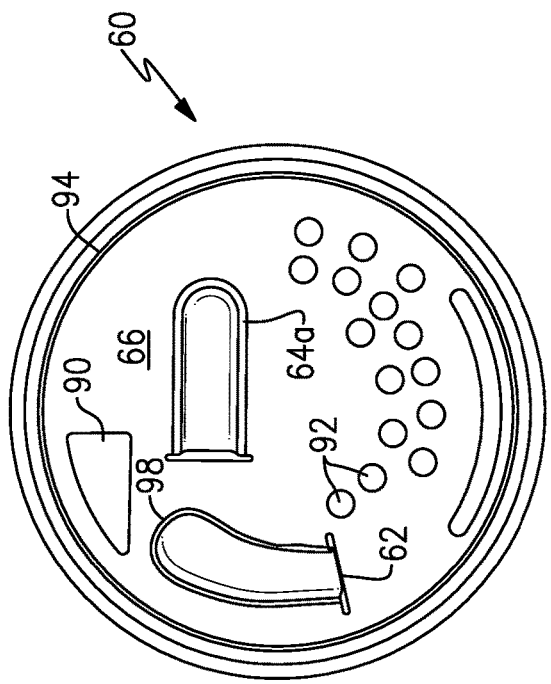
FIG. 14 is an end view of another example of an inlet baffle as used in the mixer of FIG. 2A, FIG. 5, or FIG. 10.

FIGS. 12-14 show other examples of inlet baffles 60 having different scoop combinations and different patterns of secondary openings. FIG. 12 shows an example where there are three scoops, one curved scoop 62 and two straight scoops 64a. The curved scoop 62 is positioned along the circumferential edge 94 as explained above, and the two straight scoops 64a are positioned parallel to each other near a center of the inlet baffle 60.

FIG. 13 shows an example with four scoops. There are two curved scoops 62 and two straight scoops 64a. The curved scoops 62 are positioned along the outer peripheral edge 94 and are circumferentially spaced apart, and in alignment, with each other. The two straight scoops 64a are positioned parallel to each other near a center of the inlet baffle 60.

FIG. 14 shows an example similar to that of FIG. 5 but which has the straight second scoop 64 positioned closer to the primary opening 90. In this example, the scoop opening 76 is positioned adjacent the end 98 of the first scoop 62.

The subject invention provides an inlet baffle 60 that uses scoops 62, 64, 64a in various combinations to direct exhaust gas flow in manner that provides improved mixing in addition to reducing deposit formation. In one example, the inlet baffle 60 uses the scoops 62, 64, and/or 64a in combination with the primary opening 90 to direct more flow than can be provided by the primary opening alone. The curved first scoop 62 provides a grazing flow that directs flow to the inner wall of the housing. The second scoops 64, 64a provide flow that interacts with flow from the first scoop 62 to optimize mixing. Further, additional flow is directed through the slots 96 in the inlet baffle 60 into the gap 54 to increase the temperature of the inner wall 56 of the inner housing 52 to further decrease deposit formation.

The scoops of the subject invention provide several benefits. The scoops direct flow to the inner wall, deflect the spray in a controlled manner to create a sweeping and swirling flow, and reduce deposit formation. This type of flow configuration is especially effective for dosers that produce small droplet sized spray. The scoops are positioned upstream of the injector and are used to redirect the exhaust gas flow to improve mixing of the exhaust gas with the fluid. The scoops can be positioned at various angles and positions on the inlet baffle as disclosed in the examples discussed above.

The inlet baffle with the scoops can be made using various different methods including stamping, welding, casing, extrusion, etc. The scoops can be stamped, welded, or formed on a flat, curved, angular, or helix plates. The scoops can be positioned at various angles relative to the injected flow axis. As discussed above, the scoops can be curved, straight, tapered, etc. as required to control exhaust flow for a particular application. The secondary openings include patterns of circular and/or elliptical openings that are optimized to further enhance flow and reduce deposits.

The outlet baffle 80 can be made using various different methods including stamping, welding, casing, extrusion, etc. The secondary openings include patterns of circular and/or elliptical openings that are optimized to further enhance flow and reduce deposits. The injector injects spray between the baffles 60, 80 which are positioned relative to each other in a manner to improve mixing of the fluid and exhaust gas. The primary outlet opening is configured to control back pressure and provides a main exit for mixed flow. The slots direct flow out of the gap between the inner and outer housings. In one example, the outlet baffle and inner wall are combined into one piece that is attached to the inlet baffle.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
   an exhaust component having an inner wall to define an internal cavity that provides an engine exhaust gas flow path from an inlet to an outlet;
   an injector that is configured to spray a fluid into the internal cavity to mix with engine exhaust gas; and
   an inlet baffle mounted to the exhaust component adjacent the inlet, wherein the inlet baffle includes at least one scoop having a scoop length that is greater than a scoop width, and the at least one scoop being curved in a direction extending along the scoop length, and wherein the at least one scoop comprises a recessed portion that extends inwardly from an upstream surface of the inlet baffle with the recessed portion including first and second sides connected to each other via a base, and wherein the at least one scoop includes a scoop opening that directs engine exhaust gas toward the inner wall of the internal cavity at a location that is upstream of injector spray.

2. The vehicle exhaust system according to claim 1 including at least one additional scoop that is straight along the scoop length.

3. The vehicle exhaust system according to claim 1 wherein the at least one scoop comprises no more than four scoops.

4. The vehicle exhaust system according to claim 1 wherein the recessed portion has a depth that is shallower at an end opposite from the scoop opening and gradually increases to a maximum depth that is at an end of the at least one scoop that is near the scoop opening.

5. The vehicle exhaust system according to claim 1 including a spray cone to direct injected spray into the internal cavity, the spray cone having a cone inlet that directs exhaust gas flow from the internal cavity into the spray cone to mix with the injected spray, and wherein the inlet baffle includes a cone opening adjacent a peripheral edge of the inlet baffle to direct engine exhaust gases toward the cone inlet.

6. The vehicle exhaust system according to claim 5 wherein the cone opening is positioned adjacent an end of the at least one scoop that is opposite from the scoop opening.

7. A vehicle exhaust system comprising:
an exhaust component having an inner wall to define an internal cavity that provides an engine exhaust gas flow path from an inlet to an outlet;
an injector that is configured to spray a fluid into the internal cavity to mix with engine exhaust gas; and
an inlet baffle mounted to the exhaust component adjacent the inlet, wherein the inlet baffle includes at least one scoop having a scoop length that is greater than a scoop width, and wherein the at least one scoop includes a scoop opening that directs engine exhaust gas toward the inner wall of the internal cavity at a location that is upstream of injector spray, wherein the at least one scoop comprises at least a first scoop and a second scoop, wherein the first scoop is positioned to extend along an outer peripheral edge of the inlet baffle with the first scoop being curved in a direction extending along the scoop length and having a first scoop opening that directs engine exhaust gas toward the inner wall of the internal cavity, and wherein the second scoop is positioned adjacent a central location of the inlet baffle and has a second scoop opening that directs engine exhaust gas in a direction toward the first scoop.

8. The vehicle exhaust system according to claim 7 wherein the inlet baffle only includes two scoops which comprise the first and second scoops.

9. The vehicle exhaust system according to claim 7 including a plurality of openings in the inlet baffle wherein at least one opening has a circular shape and at least one opening has an elliptical shape.

10. The vehicle exhaust system according to claim 7 wherein the exhaust component includes an outer housing and an inner wall spaced radially inward of the outer housing by a gap, and wherein the inner wall provides the inner surface that defines the internal cavity, and wherein the inlet baffle includes a plurality of slots formed along the outer peripheral edge to direct engine exhaust gas into the gap.

11. The vehicle exhaust system according to claim 7 wherein the second scoop is curved in a direction extending along the scoop length of the second scoop.

12. The vehicle exhaust system according to claim 7 and wherein the second scoop is straight in a direction extending along the scoop length of the second scoop.

13. The vehicle exhaust system according to claim 7 wherein each of the first and second scoops comprise a recessed portion that extends inwardly from an upstream surface of the inlet baffle such that the first scoop has a first depth and the second scoop has a second depth that is less than the first depth.

14. The vehicle exhaust system according to claim 7 wherein the scoop length is at least two times the width for each of the first and second scoops.

15. A mixer for a vehicle exhaust system comprising:
an outer housing;
an inner housing spaced radially inward of the outer housing to define a gap, the inner housing having an inner wall to define an internal cavity that provides an engine exhaust gas flow path from an inlet to an outlet;
an injector that is configured to spray a fluid into the internal cavity to mix with engine exhaust gas;
an inlet baffle adjacent the inlet, wherein the inlet baffle includes at least a first scoop and a second scoop each having a scoop length that is greater than a scoop width, and wherein the first scoop includes a first scoop opening that directs engine exhaust gas toward the inner wall of the internal cavity, and the second scoop includes a second scoop opening that directs engine exhaust gas in a direction toward the first scoop, and wherein at least one of the first and second scoops is curved in a direction extending along the scoop length, and wherein each of the first and second scoops comprise a recessed portion that extends inwardly from an upstream surface of the inlet baffle with the recessed portion including first and second sides connected to each other via a base; and
an outlet baffle having a primary opening through which a majority of a mixture of engine exhaust gas and spray exits the internal cavity via the outlet, and a plurality of secondary openings that are smaller than the primary opening.

16. The mixer according to claim 15 including a spray cone to direct injected spray into the internal cavity, the spray cone having a cone inlet that directs exhaust gas flow from the internal cavity into the spray cone to mix with the injected spray, and wherein the inlet baffle includes a cone opening adjacent a peripheral edge of the inlet baffle to direct engine exhaust gases toward the cone inlet, and wherein the cone opening is positioned adjacent an end of the first scoop that is opposite from the first scoop opening.

17. The mixer according to claim 15 wherein the first scoop is curved in a direction extending along the scoop length of the first scoop, and wherein the second scoop is curved or straight in a direction extending along the scoop length of the second scoop.

18. The mixer according to claim 15 wherein the first scoop has a first depth and the second scoop has a second depth that is less than the first depth.

19. The mixer according to claim 15 wherein at least one of the first and second scoops has a depth that is shallower at an end opposite from a respective one of the first and second scoop openings and gradually increases to a maximum depth that is at an end of the at least one of the first and second scoops that is near the respective one of the first and second scoop openings.

20. A mixer for a vehicle exhaust system comprising:
an outer housing;
an inner housing spaced radially inward of the outer housing to define a gap, the inner housing having an inner wall to define an internal cavity that provides an engine exhaust gas flow path from an inlet to an outlet;
an injector that is configured to spray a fluid into the internal cavity to mix with engine exhaust gas;
an inlet baffle adjacent the inlet, wherein the inlet baffle includes at least a first scoop and a second scoop each having a scoop length that is greater than a scoop width, and wherein the first scoop includes a first scoop opening that directs engine exhaust gas toward the inner wall of the internal cavity, and the second scoop includes a second scoop opening that directs engine exhaust gas in a direction toward the first scoop; and
an outlet baffle having a primary opening through which a majority of a mixture of engine exhaust gas and spray exits the internal cavity via the outlet, and a plurality of secondary openings that are smaller than the primary opening, and wherein the inlet baffle includes a plurality of secondary openings located circumferentially between the first scoop opening and an end of the second scoop that is opposite the second scoop opening, and wherein the inlet baffle includes a plurality of slots that direct engine exhaust gas into the gap between the inner and outer housings.

\* \* \* \* \*